Patented Mar. 18, 1930

1,750,847

UNITED STATES PATENT OFFICE

FREDERICK K. LINDSAY, OF LA GRANGE, ILLINOIS, ASSIGNOR TO ARIZONA MINERALS CORPORATION, OF YUMA, ARIZONA

PROCESS OF TREATING GREENSAND OR GLAUCONITE FOR THE PURPOSE OF RENDERING IT AN EFFICIENT WATER-SOFTENING AGENT

No Drawing. Application filed February 19, 1925, Serial No. 10,417. Renewed January 8, 1930.

My invention relates to a new and useful process of treating greensand or glauconite for the purpose of rendering it an efficient water-softening agent.

The object of my invention is to treat the greensand or glauconite in such a manner as to make of it an efficient water-softening agent for removing calcium and magnesium from water, and to make such an agent so that it may be regenerated with salt brine. Glauconite is a hydrous silicate of iron and potash and mixed with marl, ordinary sand, and other foreign substances makes up what is known as greensand.

A satisfactory water-softener must consist of material having a high exchange value per cubic foot in proportion to the calcium and magnesium in the water. It must be insoluble in water. It must be hard in order to resist abrasion; the particles must be of such size that water flow is not impeded; the surface of contact with water must be as great per cubic foot as possible to get maximum softening; it must be porous to increase to a maximum this surface contact; and it must be easily and cheaply regenerated. That is, restored to its original condition after having been used in the water-softening operation to the point of saturation of its water-softening properties.

Greensand will extract calcium and magnesium from hard water, and thus is itself a water-softening material, but, as found, greensand is not satisfactory mechanically in that it forms a mud when water comes in contact with it. This prevents its use for water-softening purposes because packing would result, cutting off the flow of water and the mud would wash out with the water at the time of its treatment, causing the water to be turbid, and also the material would wash away during regeneration, so that there thus would be a continuous loss of water-softening material.

Greensand can be regenerated with potassium chloride. Ammonium chloride and sodium chloride also have a regenerative effect upon greensand, but when these are used the resulting active material is no longer glauconite or the hydrous silicate of iron and potash. The use of ammonium chloride forms an ammonium salt shell around the glauconite particle and sodium chloride produces a shell of the anhydrous silicate of iron and sodium, both of which have very poor mechanical properties and are washed away as a mud.

It is the object of my invention to treat greensand in such a manner as to retain and enhance its water-softening properties to meet all of the above stated requirements of a good water-softener and at the same time render it readily capable of regeneration by washing in brine.

As is well known, when a solution of sodium silicate is treated with a solution of an acid, of the soluble salts of aluminum or of some of the soluble salts of sodium, or of several other soluble metal salts, a gel forms. These gels comprise a silicate of the sodium and the metal which has been used. As originally formed these gels have adhesive properties and comprise a jelly-like mass. When this mass has been dried it will disintegrate into a large number of hard porous particles, which are insoluble in water and which will withstand abrasion, and which when water is passed around these particles have the property of exchanging the sodium of the gel for the calcium and magnesia of the water. Such gels can readily be regenerated by washing in brine. By adding from ten per cent to fifty per cent of the greensand and mixing thoroughly with the treated sodium silicate just before gelation and then drying and washing the resulting mixture, the greensand or glauconite is cemented together by the gel and there results hard particles of water-softener material, which are insoluble in water, which resist abrasion, which because of their porosity, and particularly because of their uniformity of size, allow easy flow of water, and which give a maximum surface contact with water for a minimum volume of material. This produces a water-softener in which the advantages of greensand for that purpose are retained and in which the disadvantages above enumerated which render natural greensand impractical to use as a water-softener have been eliminated.

Specifically the practice of my process involves the following steps, it being understood that the amounts of material used which are stated are exemplary and set up preferred proportions, but wherein it is to be understood variations may be made without departing from the scope of my invention.

As an example of the practice of my process I take two litres of sodium silicate, forty-two degrees Baumé, and dilute with an equal volume of water. I dissolve two pounds of dry sodium aluminate (containing 29.5% $Al_2O_3$ and 27.27% $Na_2O$) in twenty-eight litres of water and add this solution to the solution of sodium silicate. The solution of sodium silicate is stirred vigorously while the sodium aluminate is being added, thus slightly retarding the formation of the resulting gel, and also tending to secure a homogeneous gel. During this period of retardation, and while the solutions are still being stirred, I sprinkle in from ten to fifty per cent by weight proportions of greensand into the slowly gelling mass. This greensand is thus caught and held in suspension all the way through the material as the process of thickening and gelling goes on to completion.

The gel is then placed in shallow trays having very fine mesh screen bottoms, where it is allowed to stand in racks at room temperature for about twelve hours, during which time a considerable part of the water in the gel is drained and dried away slowly and easily. The partially dried gel is then placed in a drying room where a current of warm air at about sixty degrees centigrade is passed through it. At this temperature the gel is dried until it no longer feels soft and moist, but will separate into particles without crumbling or powdering from ordinary manipulation. Drying to just the right point is important, for if it is not dried long enough, the resulting product will be soft and will pack easily into a solid mass in passing water through it, thus retarding the flow of water to be softened. On the other hand, if it is dried too long the material will powder and be subject to loss from the flow of water through it during the water-softening operation and from washing in regeneration.

The greensand water-softener product obtained by the practice of the above noted steps comprises particles of greensand cemented together and surrounded by layers of gel, which particles are quite uniform in size, are insoluble, and make a filter of the best character to permit ready flow of water through the same and having a large exposure of surface with a high exchange value. The particles of this material are of such size that packing does not result and little if any loss from washing. After the material has been used in the water-softening process until it is no longer effective it is readily regenerated by washing in brine.

I claim:

1. A process of producing an improved water-softening material which consists in producing a gel material from a mixture of sodium silicate with a soluble metal salt, agitating this mixture, adding greensand or glauconite while the mixture is being agitated and at the time gelation has begun to take place, and after complete gelation drying the resulting product.

2. A process of producing an improved water-softening material which consists in producing a gel material from a mixture of sodium silicate with a soluble metal salt, agitating this mixture, adding greensand or glauconite while the mixture is being agitated and at the time gelation has begun to take place, and thereafter drying the resulting product to a degree of dryness less than that which would produce pulverulent granulation of the resulting gel particles.

3. A process of producing an improved water-softening material which consists in producing a gel material from a mixture of sodium silicate with a soluble metal salt, agitating this mixture, adding up to fifty per cent of greensand or glauconite while the mixture is being agitated and at the time gelation has begun to take place, and after complete gelation drying the resulting product.

4. A process of producing an improved water-softening material which consists in producing a gel material from a mixture of sodium silicate with a soluble metal salt, agitating this mixture, adding greensand or glauconite while the mixture is being agitated and at the time gelation has begun to take place, after complete gelation has taken place draining the resulting gel, drying the same in trays slowly, first with atmospheric air and then with artificially heated air, and continuing the drying to a point short of pulverulent granulation of the gel.

In testimony whereof I hereunto affix my signature.

FREDERICK K. LINDSAY.